May 13, 1947.  C. W. MOTT  2,420,555
QUADRANT LEVER CONTROL
Filed Sept. 6, 1945
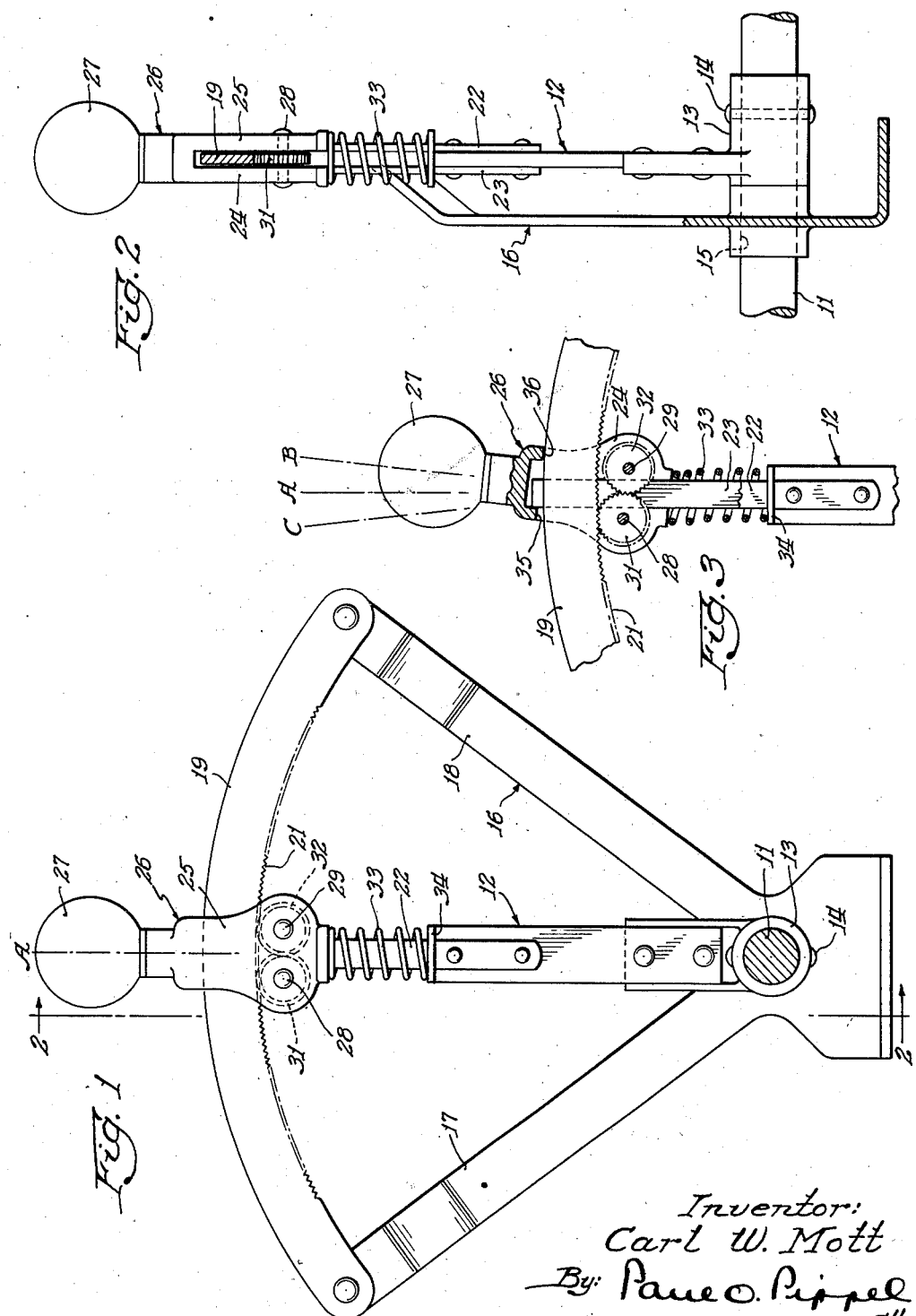
Inventor:
Carl W. Mott
By: Paul O. Pippel
Atty.

Patented May 13, 1947

2,420,555

UNITED STATES PATENT OFFICE 2,420,555

QUADRANT LEVER CONTROL

Carl W. Mott, La Grange, Ill., assignor to International Harvester Company, a corporation of New Jersey Application September 6, 1945, Serial No. 614,679

6 Claims. (Cl. 74—530)

This invention has to do with devices for locking a control structure with a rack along which the structure is adjustable and which is automatically releasable from the rack by the application of an adjusting force to the lever.

The general object of this invention is the provision of a locking device employing meshed companion gears concurrently meshable with the gear teeth of a rack along which the device is adjustable, and tiltable for disrupting the driving connection between either of the gears and the rack teeth for unlocking the device from the rack pursuant to the application of an adjusting force to the device lengthwise of the rack.

Another object is the provision of a locking device of the above character employing spring means for automatically reestablishing the locked condition of the device to the rack by tilting the gear holder into the position incurring the concurrent establishment of the driving connections of the gears with the rack when actuating force is withdrawn from the device.

The above and other desirable objects inherent in and encompassed by the invention will be more fully comprehended after reading the ensuing description with reference to the annexed drawings, wherein:

Figure 1 is a side elevational view of a control lever and quadrant therefor having a preferred form of the invention installed thereon.

Figure 2 is a view taken sectionally through the quadrant upon the plane indicated by the line 2—2 in Figure 1.

Figure 3 is a fragmentary view taken in a plane parallel with the segment strap and through a portion of the gear holder of the device, illustrating the device with the gear holder in a tilted position for demeshing of one of the gears from the toothed segment strap or rack for unlocking the device from said strap.

Continuing with reference to the drawings, the apparatus therein illustrated is for controlling and maintaining selectively rotative positions of a control shaft 11. This control shaft may be supervisorially associated with any type of apparatus not shown.

Rotation of the shaft 11 is incurred by swinging a lever 12 about the axis of said shaft, said lever having a tubular end portion 13 receiving a section of the shaft and fixed thereto by any standard means such as a rivet 14. The control shaft is rotatable within a bore 15 of a quadrant 16 having arms 17 and 18 which support opposite ends of an arcuate strap or rack member 19. The inner arcuate edge of the rack 19 is formed with a series of gear teeth 21.

Said lever 12 includes laterally spaced extensions 22 and 23 which straddle the rack 19 in a manner ascertainable in Figure 3 where the extension 23 is shown projecting slightly above the rack. Also straddling the rack 19 are spaced extensions 24 and 25 of a gear holder 26 which has an operating knob 27 on its upper end. The gear holder 26 is provided with a pair of pins 28 and 29 mounted in and extending between the extensions 24 and 25. Meshed companion gears 31 and 32 are journaled respectively upon the pins 28 and 29. A coiled expansion spring 33 exerts force between a spring reaction means 34 on the lever 12 and the lower end of the gear holder 26, whereby the gears 31 and 32 are normally forced into mesh with the rack teeth 21.

So long as the spring 33 is permitted to force the gear holder 26 into the locking position coinciding with the position-indicating line A in Figures 1 and 3, so that both of the gears 31 and 32 are meshed with the rack teeth 21, the lever will be locked against swinging movement by force received from the control shaft 11. For instance, if force from the control shaft 11 should tend to swing the lever 12 clockwise, as viewed in Figure 1, each of the gears 31 and 32 would tend to rotate clockwise because of force imparted to their teeth by the rack teeth 21. Since, however, the sides of the gears 31 and 32 in mesh with one another would have to move in opposite directions to facilitate such clockwise rotation of both gears, these gears cannot rotate and such clockwise movement of the lever is prohibited. Counterclockwise rotation of the lever 12 is prevented in like fashion since such counterclockwise rotation of the lever would tend to cause the gears 31 and 32 to rotate in the same direction, which is impossible because of the teeth of these gears being meshed with one another.

Although the locking device including the gears 31 and 32 is effective for locking the lever 12 against movement lengthwise of the rack by force exerted from the control shaft 11, said device is automatically unlocked in response to manual movement applied to the knob 27 lengthwise of the rack. Should it be desired to manually pivot the lever 12 clockwise, as viewed in Figures 1 and 3, the operating knob 27 will be grasped by an operator and forced to the right lengthwise of the rack. Because of the spacing between stop members 35 and 36 on the gear holder and upper end portions of the lever extensions 22 and 23, as illustrated in Figure 3, a lost motion connection exists between the gear holder and the lever proper, enabling the manual force on the knob 27 to tilt said gear holder into an unlocking position B, illustrated in Figure 2. In this unlocking position the gear 32 has its driving connection with the rack teeth disrupted so that the stop means 35, by virtue of continuation of the force applied to the right against the knob 27, can advance the lever 12 lengthwise of the rack to the right, while the gear 31 is driven clockwise and the gear 32 is driven idly counterclockwise from the gear 31. Such tilting of the gear holder is opposed by the spring 33 which is distorted pursuant to tilting of said holder.

After the lever has been advanced a desired distance to the right and the manual force relieved from the knob 27, the spring 33 will again force the gear holder into the locking position A for reestablishing the driving connections of both gears with the toothed rack. Thus the spring 33 tends to maintain the locking position of the device and automatically reestablishes such locking position at the culmination of lever advancement. Force applied to the manually operated knob 27 for advancing the lever 12 counterclockwise first carries the gear holder 26 into an unlocking tilted position C wherein the gear 32 remains in driving relation with the rack, wherein the gear 31 is demeshed therefrom and the stop means 36 of the lost motion connection between the gear holder and the lever proper abuts against the upper ends of the lever extensions 22 and 23 preparatory to advancing the lever to the left upon continued application of the manual force to the knob. Tilting of the gear holder into position C also distorts the spring 33 so that when the manual force is relieved from the knob 27, after the desired advancement of the lever, said spring is effective for reestablishing the locking position A of the gear holder.

Having thus described a single preferred form of the invention with the view of concisely and fully illustrating the same, I claim:

1. In a device for releasably locking a control structure selectively along a toothed rack, a gear holder advanceable along said rack and constraining said control structure captive for advancement therewith, a pair of intermeshed companion gears on said gear holder, said holder being tiltable from a locking position wherein said gears are in driving relation with said rack to an unlocked position disrupting the driving relation of one of said gears, and yieldable means operable to pivot said gear holder to establish the locking position thereof and to yieldably maintain said locking position, and said gear holder being tiltable from said locking position to the unlocked position against the force of said yieldable means by a force applied to said holder in the direction for advancing the same.

2. In a device for releasably locking a control structure selectively along a toothed rack, a gear holder advanceable along said rack and having a lost-motion connection with said structure for advancing the same therewith following dissipation of the lost motion in movement of said holder relatively to said structure from a locking position to an unlocking position in the direction for advancing said structure, a pair of intermeshed companion gears on said holder, each of said gears being disposed in a driving relation with said rack when said holder is in the locking position, said holder being operable to disrupt at least one of said gear driving relations with the rack pursuant to movement of said holder into the unlocking position, and means operable upon the termination of actuating force to said holder to return the same to the locking position and to yieldably maintain it in such position.

3. In a device for releasably locking a control structure selectively along a toothed rack, a gear holder advanceable along said rack and having a lost-motion connection with said structure for advancing the same therewith following dissipation of the lost motion in movement of said holder relatively to said structure from a locking position to an unlocking position in the direction for advancing said structure, a pair of intermeshed companion gears on said holder, each of said gears being disposed in mesh with said rack when the holder is in the locking position, said holder being operable to displace at least one of said gears from mesh with the rack pursuant to movement of said holder into the unlocking position, and means operable upon the termination of actuating force to said holder to return the same to the locking position and to yieldably maintain it in such position.

4. In a device for releasably locking a control structure selectively along a toothed rack, a gear holder advanceable along said rack in either of opposite directions and having a lost-motion connection with said structure for advancing the same therewith following movement of said holder relatively to said structure from a locking position to either of unlocking positions respectively spaced from the locking position in the opposite directions of said structure advancement, a pair of intermeshed companion gears on said holder, each of said gears being disposed in driving relation with said rack when the holder is in the locking position, said holder being operable to disrupt said driving relation of at least one of said gears pursuant to movement of said holder into either unlocking position, and means operable upon the termination of actuating force to said holder to return the same to the locking position and to yieldably maintain it in such position.

5. In a device for releasably locking a control structure selectively along a toothed rack, a gear holder advanceable along said rack and mounted on said structure for movement relatively thereto transversely of the rack and also for limited tilting movement relatively thereto lengthwise of the rack, meshed companion gears on said holder and in a plane common with said rack to facilitate concurrent meshing of the gears therewith, and a spring reacting between said structure and said holder to urge the latter into a locking position wherein said concurrent meshing of the gears with the rack obtains, said holder being selectively tiltable, against the force of said spring, oppositely from said locking position by force applied thereto lengthwise of the rack preparatory to imparting advancing movement to said structure by continued application of such force after attainment of the tilting limit, and said holder being operable to demesh one of said gears from the rack when tilted in one direction and to demesh the other of said gears from the rack when tilted in the opposite direction.

6. In a device for releasably locking a pivoted control lever selectively along a quadrant strap therefor having gear teeth on its edge facing the lever pivot axis, said lever having laterally spaced end portions straddling said strap, a gear holder having a manually operated knob disposed radially outwardly from said strap and having side portions straddling said strap and said lever end portions, meshed companion gears carried on said holder between its side portions and with their axes spaced lengthwise of the strap to facilitate concurrent meshing of said gears with the strap gear teeth, spring reaction means on the lever radially inwardly of its pivotal axis from said holder, a helical spring about said lever and reacting endwise between said reaction means and said holder to yieldably press said gears into mesh with the strap teeth, said holder being oppositely tiltable relatively to the lever by operating force applied to said knob in respectively opposite directions lengthwise of the strap pursuant to compressing said spring and demeshing respective of the gears from the strap teeth, and means on said holder abuttable with the lever for limiting such tilting and causing pivoting of the lever by the continued application of such force subsequent to the demeshing of said gears.

CARL W. MOTT.

REFERENCES CITED

The following references are of record in the file of this patent:

UNITED STATES PATENTS

| Number | Name | Date |
| --- | --- | --- |
| 812,216 | Lorimer | Feb. 13, 1906 |
| 1,902,071 | Hathorn | Mar. 21, 1933 |
| 1,968,159 | Nickliss | July 31, 1934 |
| 2,296,694 | Wilton | Sept. 22, 1942 |